US008817825B2

(12) United States Patent
Kent et al.

(10) Patent No.: US 8,817,825 B2
(45) Date of Patent: Aug. 26, 2014

(54) METHOD AND SYSTEM FOR SINGLE WEIGHT (SW) ANTENNA SYSTEM FOR SPATIAL MULTIPLEXING (SM) MIMO SYSTEM FOR WCDMA/HSDPA

(71) Applicant: Broadcom Corporation, Irvine, CA (US)

(72) Inventors: Mark Kent, Vista, CA (US); Vinko Erceg, Cardiff, CA (US); Uri Landau, San Diego, CA (US); Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/784,340

(22) Filed: Mar. 4, 2013

(65) Prior Publication Data

US 2013/0177050 A1    Jul. 11, 2013

Related U.S. Application Data

(63) Continuation of application No. 11/174,067, filed on Jun. 30, 2008, now Pat. No. 8,391,322, which is a (Continued)

(51) Int. Cl.
*H04J 3/04* (2006.01)
*H04B 7/216* (2006.01)
*H04B 1/10* (2006.01)
*H04B 1/00* (2006.01)
*H04B 7/08* (2006.01)

(52) U.S. Cl.
USPC ........... 370/536; 370/335; 375/349; 375/148; 455/132; 455/136; 455/143

(58) Field of Classification Search
USPC .................... 455/59, 63.1, 65, 132, 136, 143; 370/314, 335, 535, 536; 375/347, 348, 375/349, 148, 152
See application file for complete search history.

(56) References Cited

U.S. PATENT DOCUMENTS 5,345,599 A    9/1994 Paulraj et al.
5,625,880 A    4/1997 Goldburg et al.
(Continued)

FOREIGN PATENT DOCUMENTS

CN    1354610    6/2002
WO    WO 01/78355    10/2001
(Continued)

OTHER PUBLICATIONS

Jan Mietzner et al., University of Kiel, Adaptive Antennas and MIMO Systems for Wireless Communications, "Boosting the Performance of Wireless Communication Systems: Theory and Practice of Multiple-Antenna Techniques," IEEE Communications Magazine, Oct. 2004, pp. 40-47.

(Continued)

*Primary Examiner* — Wesley Kim
(74) *Attorney, Agent, or Firm* — Sterne, Kessler, Goldstein & Fox PLLC

(57) ABSTRACT

Methods and systems for processing signals in a receiver are disclosed herein and may comprise receiving spatially multiplexed signals via M receive antennas. A plurality of multiple data streams may be separated in the received spatially multiplexed signals to detect MIMO data streams. Each of the MIMO data streams may correspond to a spatially multiplexed input signal. Complex phase and/or amplitude may be estimated for each detected MIMO data streams utilizing (M-1) phase shifters. Complex waveforms, comprising in-phase (I) and quadrature (Q) components for the MIMO data streams within the received spatially multiplexed signals may be processed and the processed complex waveforms may be filtered to generate baseband bandwidth limited signals. Phase and/or amplitude for one or more received spatially multiplexed signals may be adjusted utilizing the estimated complex phase and amplitude. Phase and/or amplitude may be adjusted continuously and/or at discrete intervals.

20 Claims, 11 Drawing Sheets

Related U.S. Application Data continuation-in-part of application No. 10/886,510, filed on Jul. 7, 2004, now Pat. No. 7,983,355.

(60) Provisional application No. 60/616,949, filed on Oct. 6, 2004, provisional application No. 60/485,915, filed on Jul. 9, 2003, provisional application No. 60/491,128, filed on Jul. 29, 2003.

(56) References Cited

U.S. PATENT DOCUMENTS

| | | | |
|---|---|---|---|
| 5,642,353 | A | 6/1997 | Roy, III et al. |
| 5,719,583 | A | 2/1998 | Kanai |
| 5,809,422 | A | 9/1998 | Raleigh et al. |
| 5,822,312 | A | 10/1998 | Peach et al. |
| 5,834,972 | A | 11/1998 | Schiemenz et al. |
| 5,949,833 | A | 9/1999 | Weerackody |
| 5,991,273 | A | 11/1999 | Abu-Dayya |
| 6,016,124 | A | 1/2000 | Lo et al. |
| 6,029,056 | A | 2/2000 | Kiyanagi et al. |
| 6,115,409 | A | 9/2000 | Upadhyay et al. |
| 6,144,711 | A | 11/2000 | Raleigh et al. |
| 6,192,256 | B1 | 2/2001 | Whinnett |
| 6,240,098 | B1 | 5/2001 | Thibault et al. |
| 6,269,075 | B1 | 7/2001 | Tran |
| 6,351,499 | B1 | 2/2002 | Paulraj et al. |
| 6,373,433 | B1 | 4/2002 | Espax et al. |
| 6,400,318 | B1 | 6/2002 | Kasami et al. |
| 6,452,981 | B1 | 9/2002 | Raleigh et al. |
| 6,463,295 | B1 | 10/2002 | Yun |
| 6,590,532 | B1 | 7/2003 | Ogawa et al. |
| 6,618,454 | B1 | 9/2003 | Agrawal et al. |
| 6,628,969 | B1 | 9/2003 | Rilling |
| 6,665,335 | B1 | 12/2003 | Rajagopal et al. |
| 6,697,017 | B1 | 2/2004 | Shmuel |
| 6,721,339 | B2 | 4/2004 | Li et al. |
| 6,760,592 | B2 | 7/2004 | Hernandez et al. |
| 6,765,969 | B1 | 7/2004 | Vook et al. |
| 6,771,706 | B2 | 8/2004 | Ling et al. |
| 6,778,612 | B1 | 8/2004 | Lozano et al. |
| 6,785,520 | B2 | 8/2004 | Sugar et al. |
| 6,804,216 | B1 | 10/2004 | Kuwahara et al. |
| 6,831,942 | B2 | 12/2004 | Guo et al. |
| 6,873,651 | B2 | 3/2005 | Tesfai et al. |
| 6,882,678 | B2 | 4/2005 | Kong et al. |
| 6,888,809 | B1 | 5/2005 | Foschini et al. |
| 6,891,516 | B1 | 5/2005 | Saunders et al. |
| 6,937,592 | B1 * | 8/2005 | Heath et al. .................. 370/342 |
| 6,963,619 | B1 | 11/2005 | Gesbert et al. |
| 6,968,022 | B1 | 11/2005 | Poor et al. |
| 6,985,434 | B2 | 1/2006 | Wu et al. |
| 7,020,110 | B2 | 3/2006 | Walton et al. |
| 7,024,166 | B2 | 4/2006 | Wallace et al. |
| 7,072,413 | B2 | 7/2006 | Walton et al. |
| 7,076,168 | B1 | 7/2006 | Shattil |
| 7,079,867 | B2 | 7/2006 | Chun et al. |
| 7,110,468 | B2 | 9/2006 | Kohno et al. |
| 7,177,369 | B2 | 2/2007 | Crilly, Jr. |
| 7,184,500 | B2 | 2/2007 | Li et al. |
| 7,230,931 | B2 | 6/2007 | Struhsaker |
| 7,236,478 | B2 | 6/2007 | Wu et al. |
| 7,236,537 | B2 | 6/2007 | Hottinen et al. |
| 7,248,656 | B2 | 7/2007 | da Silveira et al. |
| 7,327,800 | B2 | 2/2008 | Oprea et al. |
| 7,515,714 | B2 | 4/2009 | Orihashi et al. |
| 7,522,673 | B2 | 4/2009 | Giannakis et al. |
| 7,535,969 | B2 | 5/2009 | Catreux |
| 7,538,274 | B2 | 5/2009 | Bertini |
| 7,822,140 | B2 | 10/2010 | Catreux |
| 7,869,537 | B2 | 1/2011 | Catreux |
| 2001/0038356 | A1 | 11/2001 | Frank |
| 2002/0051436 | A1 | 5/2002 | Ertel et al. |
| 2002/0094019 | A1 | 7/2002 | Mesecher |
| 2002/0126042 | A1 | 9/2002 | Chang et al. |
| 2002/0191535 | A1 | 12/2002 | Sugiyama et al. |
| 2002/0196842 | A1 * | 12/2002 | Onggosanusi et al. ....... 375/148 |
| 2003/0017852 | A1 | 1/2003 | Miyatani |
| 2003/0043929 | A1 | 3/2003 | Sampath |
| 2003/0045313 | A1 | 3/2003 | Iwamatsu et al. |
| 2003/0048856 | A1 | 3/2003 | Ketchum et al. |
| 2003/0198284 | A1 | 10/2003 | Mesecher et al. |
| 2003/0231547 | A1 | 12/2003 | Yang |
| 2003/0231606 | A1 | 12/2003 | Wu et al. |
| 2004/0095907 | A1 | 5/2004 | Agee et al. |
| 2004/0105489 | A1 | 6/2004 | Kim et al. |
| 2004/0125899 | A1 | 7/2004 | Li et al. |
| 2004/0165558 | A1 | 8/2004 | Ling et al. |
| 2004/0178954 | A1 | 9/2004 | Vook et al. |
| 2004/0184398 | A1 | 9/2004 | Walton et al. |
| 2004/0192218 | A1 | 9/2004 | Oprea |
| 2004/0208258 | A1 | 10/2004 | Lozano et al. |
| 2004/0266485 | A1 | 12/2004 | Paramesh et al. |
| 2005/0032497 | A1 | 2/2005 | Girardeau et al. |
| 2005/0053164 | A1 | 3/2005 | Catreux et al. |
| 2005/0243898 | A1 | 11/2005 | Reznik et al. |
| 2006/0104197 | A1 | 5/2006 | Proctor et al. |
| 2006/0135101 | A1 | 6/2006 | Binshtok et al. |
| 2009/0233567 | A1 | 9/2009 | Catreux et al. |

FOREIGN PATENT DOCUMENTS

| | | |
|---|---|---|
| WO | WO 2004/001893 | 12/2003 |
| WO | WO 2004/084447 | 9/2004 |

OTHER PUBLICATIONS

Simon Haykin, McMaster University; Mathini Sellathurai, Yvo de Jong, and Tricia Willink, Communications research Centre Canada, Adaptive Antennas and MIMO Systems for Wireless Communications, "Turbo-MIMO for Wireless Communications," IEEE Communicatins Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, "What is the Value of Limited Feedback for MIMO Channels?" IEEE Communications Magazine, Oct. 2004, pp, 5459.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communciations, "An Introduction to the Multi-User MIMO Downlink," IEEE Communications Magazine, Oct. 2004, pp. 60-67.

Shahab Sanayei et al., University of Texas at Dallas, Adaptive Antennas and MIMO Systems for Wireless Communications, "Antenna Selection in MIMO Systems," IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, "Cooperative Communication in Wireless Networks," IEEE Communications Magazine, Oct. 2004, pp. 74-80.

* cited by examiner

METHOD AND SYSTEM FOR SINGLE WEIGHT (SW) ANTENNA SYSTEM FOR SPATIAL MULTIPLEXING (SM) MIMO SYSTEM FOR WCDMA/HSDPA

CROSS-REFERENCE TO RELATED APPLICATIONS/INCORPORATION BY REFERENCE

This patent is a continuation application of U.S. patent application Ser. No. 11/174,067, filed Jun. 30, 2005, which claims the benefit of U.S. Patent Provisional Application No. 60/616,949, filed Oct. 6, 2004, and is a continuation-in-part of U.S. patent application Ser. No. 10/886,510, filed Jul. 7, 2004, which claims the benefit of U.S. Provisional Patent Application No. 60/485,915, filed Jul. 9, 2003, and U.S. Provisional Patent Application No. 60/491,128, filed Jul. 29, 2003, all of which are incorporated by reference in their entirety.

This application is related to the following applications, each of which is incorporated herein by reference in its entirety:

U.S. patent application Ser. No. 11/173,870 filed Jun. 30, 2005;

U.S. patent application Ser. No. 11/174,303 filed Jun. 30, 2005;

U.S. patent application Ser. No. 11/173,502 filed Jun. 30, 2005;

U.S. patent application Ser. No. 11/173,871 filed Jun. 30, 2005;

U.S. patent application Ser. No. 11/173,964 filed Jun. 30, 2005;

U.S. patent application Ser. No. 11/173,252 filed Jun. 30, 2005;

U.S. patent application Ser. No. 11/174,252 filed Jun. 30, 2005;

U.S. patent application Ser. No. 11/172,756 filed Jun. 30, 2005;

U.S. patent application Ser. No. 11/173,305 filed Jun. 30, 2005;

U.S. patent application Ser. No. 11/172,759 filed Jun. 30, 2005;

U.S. patent application Ser. No. 11/173,689 filed Jun. 30, 2005;

U.S. patent application Ser. No. 11/173,304 filed Jun. 30, 2005;

U.S. patent application Ser. No. 11/173,129 filed Jun. 30, 2005;

U.S. patent application Ser. No. 11/172,779 filed Jun. 30, 2005;

U.S. patent application Ser. No. 11/172,702 filed Jun. 30, 2005;

U.S. patent application Ser. No. 11/173,727 filed Jun. 30, 2005;

U.S. patent application Ser. No. 11/173,726 filed Jun. 30, 2005;

U.S. patent application Ser. No. 11/172,781 filed Jun. 30, 2005;

U.S. patent application Ser. No. 11/173,854 filed Jun. 30, 2005;

U.S. patent application Ser. No. 11/173,911 filed Jun. 30, 2005; and

U.S. patent application Ser. No. 11/174,403 filed Jun. 30, 2005.

FIELD OF THE INVENTION

Certain embodiments of the invention relate to processing received radio frequency (RF) signals. More specifically, certain embodiments of the invention relate to a method and system for single weight (SW) antenna system for spatial multiplexing (SM) multi-input multi-output (MIMO) system for WCDMA/HSDPA.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1a is a technology timeline indicating evolution of existing WCDMA specification to provide increased downlink throughput. Referring to FIG. 1a, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications, System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel.

In some instances, HSDPA may provide a two-fold improvement in network capacity as well as data speeds up to five times (over 10 Mbit/s) higher than those in even the most advanced 3G networks, HSDPA may also shorten the roundtrip time between network and terminal, while reducing variances in downlink transmission delay. These performance advances may translate directly into improved network performance and higher subscriber satisfaction. Since HSDPA is an extension of the WCDMA family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 Kbits to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals can be combined in several ways, from which maximum ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI and inter-path interference (IPI) The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

To combat MAI, linear interference suppression algorithms can be utilized, which are based on linear channel equalization and are suitable for WCDMA/HSDPA systems using long, orthogonal scrambling codes. Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M-1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. Providing a separate RF chain, for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for single weight (SW) antenna system for spatial multiplexing (SM) MIMO system for WCDMA/HSDPA, substantially as shop in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for single weight (SW) antenna system for spatial multiplexing (SM) multiple-input multiple output (MIMO) system for WCDMA/HSDPA. In accordance with an exemplary aspect of the invention, a spatially multiplexed multipath signal may be received via M receive antennas. A single weight generator baseband processor may be utilized to generate a plurality of control signals, or weights, which may be utilized by (M-1) phase shifters to adjust phase and/or amplitude for a plurality of data streams of the received spatially multiplexed multipath signal. Furthermore, the signal weight generator baseband processor may also generate control signals, which may be utilized for phase and/or amplitude adjustment during diversity mode of transmit processing of one or more spatially multiplexed WCDMA or HSDPA signals.

Figure 1A:
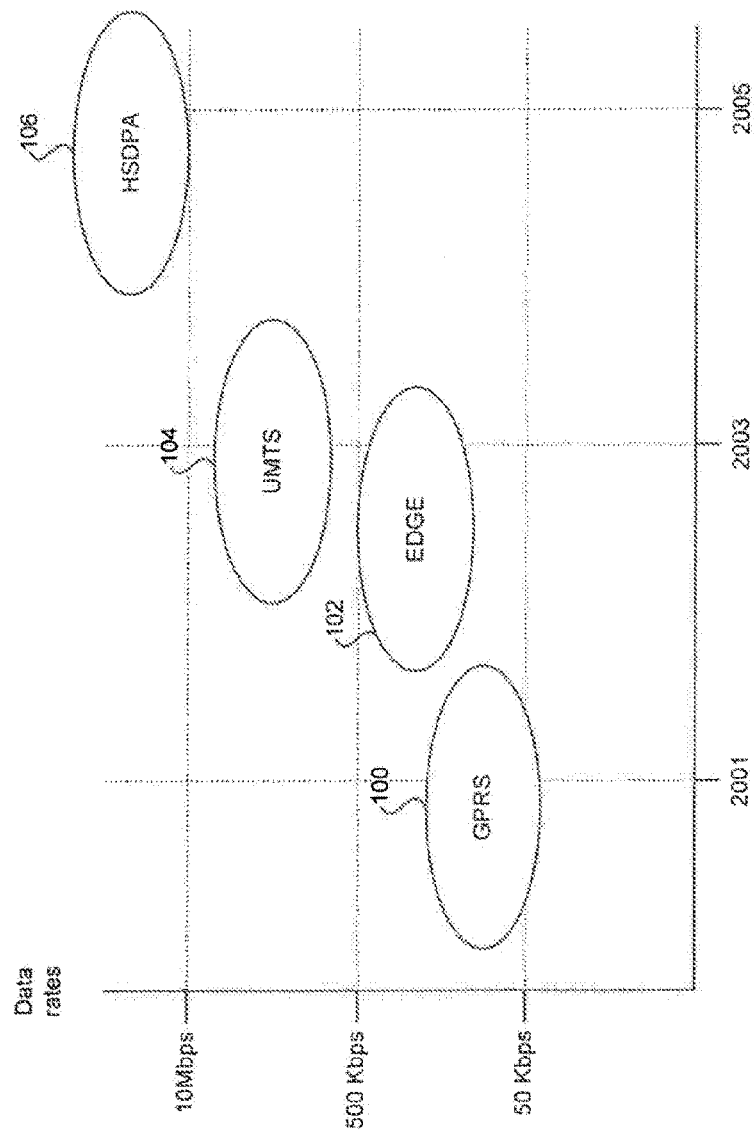
FIG. 1a is a technology timeline indicating evolution of existing WCDMA specification to provide increased downlink throughput.
Figure 1B:
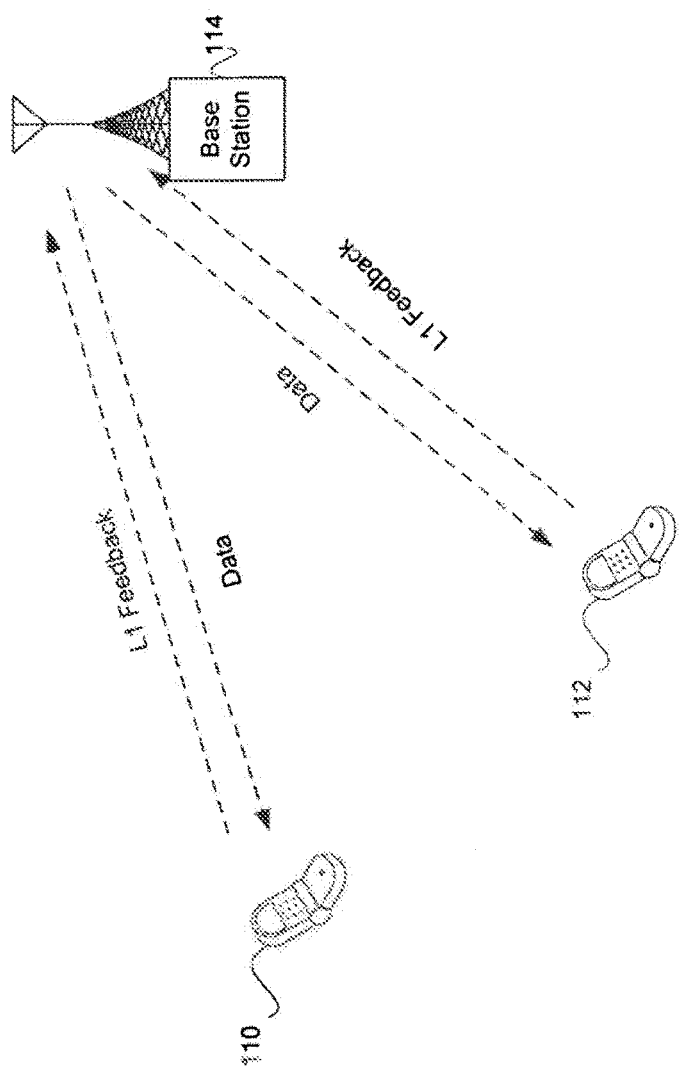
FIG. 1b illustrates an exemplary HSDPA distributed architecture that achieves low delay link adaptation, in connection with an embodiment of the invention.

FIG. 1b illustrates an exemplary HSDPA distributed architecture that achieves low delay link adaptation, in connection with an embodiment of the invention. Referring to FIG. 1b, there is shown terminals 110 and 112 and a base station (BS) 114. HSDPA is built on a distributed architecture that achieves low delay link adaptation by placing key processing at the BS 114, which may be a medium access control (MAC), closer to the physical layer (PHY) air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control cannot reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
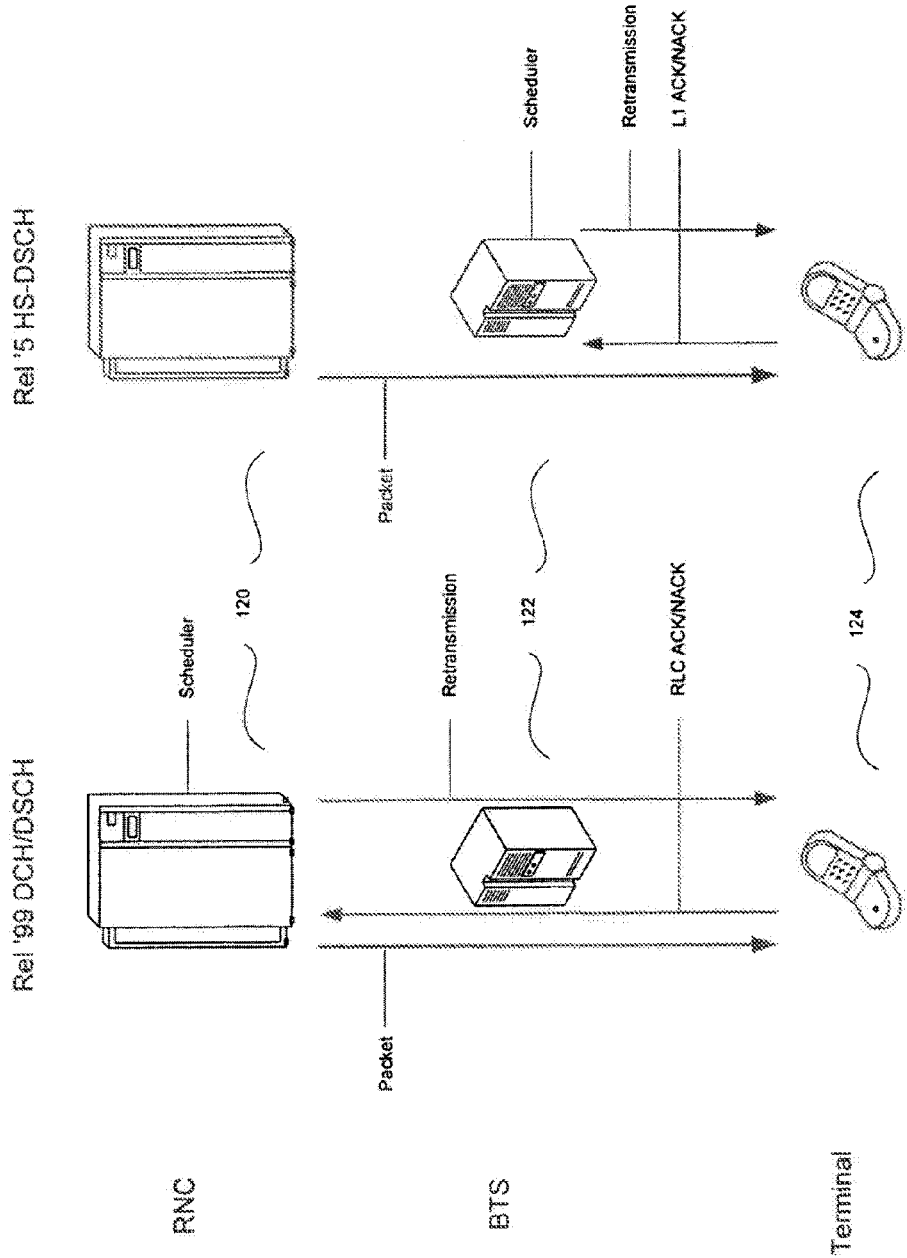
FIG. 1c illustrates an exemplary Layer 1 HARQ control situated in a base station to remove retransmission-related scheduling and storing from the radio network controller, in connection with an embodiment of the invention.

FIG. 1c illustrates an exemplary Layer 1 HARQ control situated in a base station to remove retransmission-related scheduling and storing from the radio network controller, in connection with an embodiment of the invention. Referring to FIG. 1c, there is shown a hybrid automatic repeat request (HARQ) operation, which is an operation designed to reduce the delay and increase the efficiency of retransmissions. Layer 1 HARQ control is situated in the Node B, or base station (BS), 122 thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Furthermore, received packets are combined at the physical (PHY) layer and retrieved only if successfully decoded. If decoding has failed, the new transmission is combined with the old transmission before channel decoding. The HSDPA approach allows previously transmitted frames (that failed to be decoded) to be combined with the retransmission. This combining strategy provides improved decoding efficiencies and diversity gains while minimizing the need for additional repeat requests.

While the spreading factor may be fixed, the coding rate may vary between ¼ and ¾, and the HSDPA specification supports the use of up to 10 muiticodes. More robust coding, fast HARQ, and multi-code operation eliminates the need for variable spreading factor and also allows for more advanced receiver structures in the mobile such as equalizers as opposed to the traditional RAKE receiver used in most CDMA systems. This approach may also allow users having good signal quality or higher coding rates and those at the more distant edge of the cell having lower coding rates to each receive an optima available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms interval frame length (also known as time transmit interval), compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may support 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
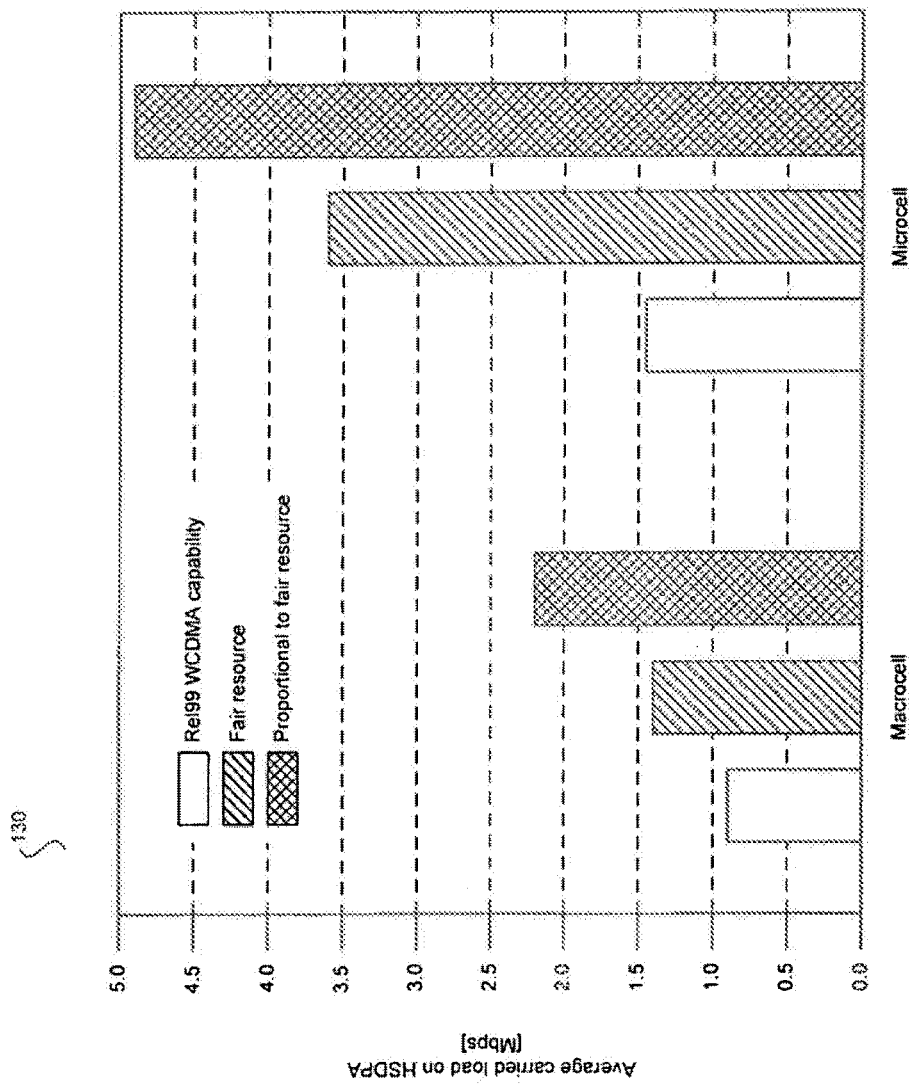
FIG. 1d is a chart illustrating exemplary average carried loads for HSDPA-based macrocell and microcell systems, in connection with an embodiment of the invention.

FIG. 1d is a chart illustrating exemplary average carried loads for HSDPA-based macrocell and microcell systems, in connection with an embodiment of the invention. Referring to chart 130 in FIG. 1d, in practical deployments, HSDPA more than doubles the achievable peak user bit rates compared to WCDMA Release 99. With hit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 1E:
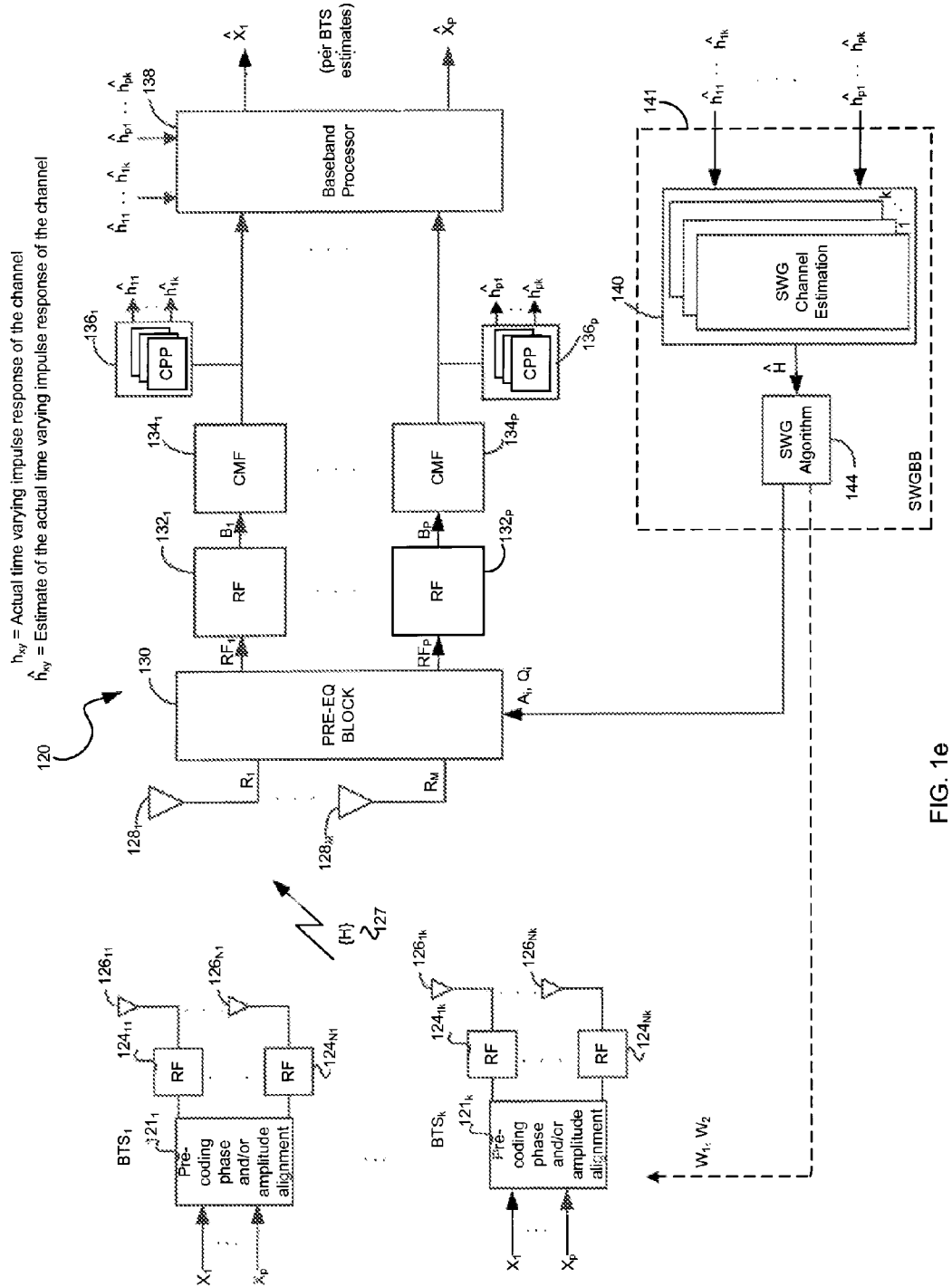
FIG. 1e is a block diagram of an exemplary spatial multiplexing (SM) multiple-input multiple-output (MIMO) antenna system utilizing single weight (SW), in accordance with an embodiment of the invention.

FIG. 1e is a block diagram of an exemplary spatial multiplexing (SM) multiple-input multiple-output (MIMO) antenna system utilizing single weight (SW), in accordance with an embodiment of the invention. Referring to FIG. 1e, there is shown a transceiver system 120 that may comprise one or more baseband transmit stations (BTS) $BTS_1$ through $BTS_k$, a plurality of receive antennas $128_{1 \ldots M}$, a pre-equalization block 130, a plurality of radio frequency (RF) receive blocks $132_{1...P}$, a plurality of chip matched filters (CMF) $134_{1...P}$, a plurality of cluster path processors CPP $136_{1...P}$, a baseband processor 138, a single weight generator baseband processor block 141 that comprises a single weight generator (SWG) channel estimation block 140 and a single weight generator (SWG) algorithm block 144.

On the transmit side, each baseband transmit station $BIS_i$ may comprise pre-coding phase and/or amplitude alignment blocks $121_i$, N number of RF transmit blocks $124_{1i...Ni}$ and N number of antennas $126_{1i...Ni}$ for each $BTS_i$. Each $BTS_i$ may transmit one or more spatially multiplexed signals over channels having actual time varying impulse responses. The total time varying impulse response 127 of all receive and transmit channels utilized within the transceiver system 120 may correspond to the channel matrix H. In one aspect of the invention, each of the $BTS_i$ may utilize spatial multiplexing techniques to transmit one or more signals utilizing the transmit antennas $126_{1i...N}$ which correspond to $BTS_i$. However, the invention may not be limited in this regard. For example, one or more antennas from other BTS may be utilized during the same transmission of the spatially multiplexed signal.

The pre-coding phase and/or amplitude alignment blocks $121_i$ may comprise suitable circuitry, logic, and/or code and may be adapted to utilize a channel feedback from the single weight generator (SWG) algorithm block 144. For example, the pre-coding phase and/or amplitude alignment blocks $121_i$ may be adapted to utilize a set of weights $w_1$ and $w_2$, for example, to convolve with the transmitted spatially multiplexed signal. The pre-coding phase and amplitude alignment blocks $121_i$ may be adapted to generate a frequency selective signal by utilizing, for example, a 2D filtering process that may comprise matrix multiplication of the calculated weights and the transmitted data sequences. Consequently, the channel may be transformed from a frequency selective channel to a flat fading channel. In this regard, the pre-coding phase and/or amplitude alignment blocks $121_i$ may be adapted to utilize, for example, an adaptive algorithm to adaptively calculate weights and iteratively search for an optimal weight solution. In accordance with an embodiment of the invention, the pre-coding phase and/or amplitude alignment blocks $121_i$ may be adapted to utilize, for example, a least mean square (LMS) algorithm for the weight calculation. Under these circumstances, the LMS algorithm may provide a good compromise between implementation complexity and performance gains. Notwithstanding, the invention is not limited in this regard, and other weight calculation algorithms may be utilized. Furthermore, the pre-coding phase and amplitude alignment blocks $121_i$ may also be utilized during processing of a multipath signal as well.

The RF transmit blocks $124_{1i...Ni}$ may comprise suitable logic, circuitry, and/or code that may be adapted to process an RF signal. The RF transmit blocks $124_{1i...Ni}$ may perform, for example, filtering, amplification, and/or analog-to-digital (A/D) conversion operations. The plurality of transmit antennas $126_{1i...Ni}$ may transmit the processed RF signals from the plurality of RF transmit blocks $124_{1i...Ni}$ to a plurality of receive antennas $128_{1...M}$.

The pre-equalization block 130 may comprise suitable logic, circuitry, and/or code that may be adapted to acquire one or more control signals, or weights, from the single weight generator baseband processor block 141 to be applied to each of the input signals $R_{1...M}$. Consequently, the pre-equalization block 130 may modify phase and/or amplitude of a portion of the transmitted spatially multiplexed signals received by the plurality of receive antennas $128_{1...M}$ and generate a plurality of output signals $RF_{1...P}$. The plurality of RF receive blocks $132_{1...P}$ may comprise suitable logic, circuitry and/or code that may be adapted to amplify and convert the received analog RF signals $RF_{1...P}$ down to baseband frequency. The plurality of RF receive blocks $132_{1...P}$ may each comprise an analog-to-digital (A/D) converter that may be utilized to digitize the received analog baseband signal, as well as voltage controlled oscillator, a mixer, and/or a low pass filter.

The plurality of chip matched filters (CMF) $134_{1...P}$ may comprise suitable logic, circuitry, and/or code that may be adapted to filter outputs of the plurality of RF receive blocks $132_{1...P}$ so as to produce in-phase (I) and quadrature (Q) components. In this regard, in an embodiment of the invention, the plurality of chip matched filters (CMF) $134_{1...P}$ may comprise a pair of digital filters, for example, that may be adapted to filter the I and Q components to within the bandwidth of WCDMA baseband, for example 3.84 MHz.

The plurality of cluster path processors (CPP) $136_{1...P}$ may be adapted to generate a plurality of k estimates of the actual time varying impulse responses of the channel $\hat{h}_{i1...ik}$ for each receive antenna $R_i$. The SWG channel estimation block 140 may process the estimates of the actual time varying impulse responses of the channels $\hat{h}_{i1...ik}$ for each receive antenna $R_i$ and may be adapted to generate a matrix $\hat{H}$ of processed estimated channels that may be utilized by the single weight generator (SWG) algorithm block 144. In one aspect of the invention, the SWG channel estimation block 140 may comprise a plurality of SWG channel estimation blocks. For example, the SWG channel estimation block 140 may comprise k SWG channel estimation blocks, each of which may be adapted to process the estimates of the actual time varying impulse response of the channels $\hat{h}_{i1...ik}$ for each receive antenna $R_i$ and generate the matrix $\hat{H}$.

U.S. application Ser. No. 11/173,854 provides a detailed description of signal clusters and is hereby incorporated herein by reference in its entirety.

The baseband processor 138 may be adapted to receive a plurality of in-phase (I) and quadrature (Q) from the plurality of chip matched filters (CMF) $134_{1...P}$ and estimates of the actual time varying impulse response of the channel $\hat{h}_{i1...ik}$ for each receive antenna $R_i$ from a corresponding cluster path processor CPP 136. The baseband processor 138 may then generate a plurality of estimates to $\hat{X}_1$ to $\hat{X}_P$ of the original input signals $X_1$ to $X_P$ per baseband transmit station. The baseband processor 138 may also be adapted to separate the different space-time channels utilizing a BLAST algorithm, for example, by performing sub-stream detection and sub-stream cancellation. Under these circumstances, the capacity of transmission may be increased almost linearly by utilizing the BLAST algorithm. In one aspect of the invention, estimates of the actual time varying impulse response of the channel from the same CPP block may be utilized by the baseband processor 138 to generate estimates of the spatially multiplexed signal transmitted within the transceiver system 120. However, the present invention may not be limited in this manner and estimates of the actual time varying impulse response of the channel from different baseband transmit stations may also be utilized by the baseband processor 138 to generate estimates of the spatially multiplexed transmitted signal.

The SWG algorithm block 144 may be adapted to determine a plurality of phase and amplitude values $A_i$ and $Q_i$ which may be utilized by the pre-equalization block 130 to modify phase and/or amplitude of a portion of the transmitted signals received by the plurality of receive antennas $128_{1...M}$ and generate a plurality of output signals $RF_{1...P}$. The SWG algorithm block 144 may also be adapted to calculate the effective weights $W_1$ and $W_2$ to be sent to the pre-coding phase and amplitude alignment blocks $121_i$. The weight calculation may be based on a cost function or a second order statistical technique based on the pre-equalization method used.

Figure 2:
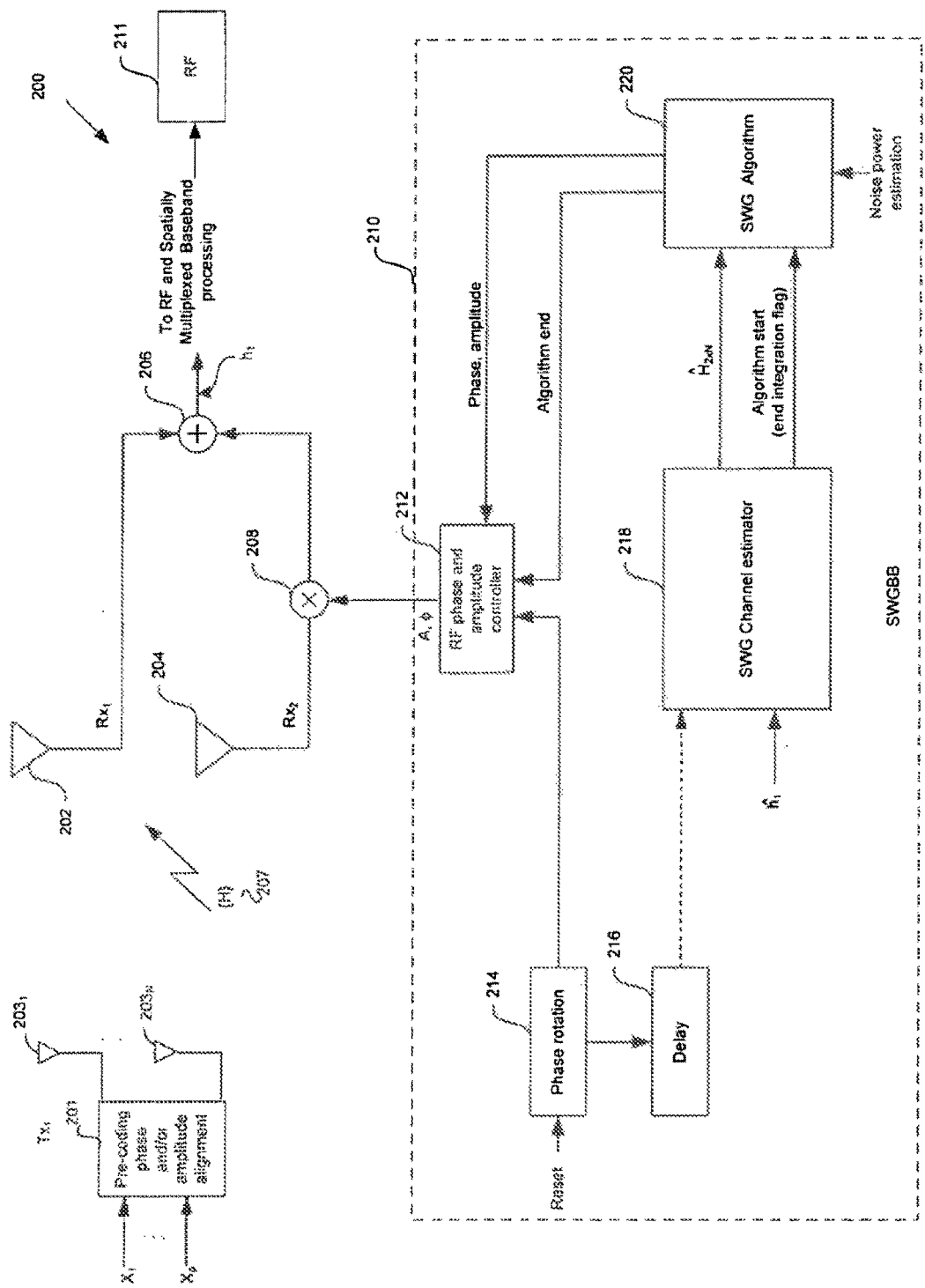
FIG. 2 is a block diagram of an exemplary system utilizing N-transmit and 2-receive antennas for phase rotation and determining the best phase and amplitude of an additional receive antenna, in accordance with an embodiment of the invention.

FIG. 2 is a block diagram of an exemplary system utilizing N-transmit and 2-receive antennas for phase rotation and determining the best phase and amplitude of an additional receive antenna, in accordance with an embodiment of the invention. Referring to FIG. 2, the exemplary system 200 may comprise a transmitter $Tx_1$, a first receive antenna $Rx_1$ 202, a second receive antenna $Rx_2$ 204, a combiner 206, a complex multiplier 208, an RF module 211, and a single weight generator baseband (SWGBB) processor 210. The transmitter $Tx_1$ may comprise a pre-coding phase and/or amplitude alignment block 201 and a plurality of N transmit antennas, $203_1 \ldots _N$. The total time varying impulse response of all receive and transmit channels between $Tx_1$ and $Rx_1$ and $Rx_2$ utilized within the exemplary system 200 may correspond to the channel matrix H 207.

The combiner 206 may comprise suitable circuitry, logic, and/or code and may be adapted to combine the spatially multiplexed signal received at antenna $Rx_2$ with the spatially multiplexed signal received at antenna $Rx_1$. The combined signal may correspond to the actual time varying impulse response $h_1$ for the two receive antennas. The combined signal may then be processed by the RF module 211.

The SWGBB processor 210 may comprise a phase rotation start controller 214, a delay 216, a SWG channel estimator 218, a single weight generator (SWG) algorithm block 220, and a RF phase and amplitude controller 212. The description of the SWGBB processor 210 provides a more detailed functional description of the SWGBB processor 141 that is illustrated in FIG. 1e. Even though the SWGBB processor 210 utilizes phase rotation for generating the phase and amplitude, the present invention is not so limited. Accordingly, other methods for generating orthogonal sequences may be utilized for implementing the SWGBB processor 210 and for generating the phase and amplitude values within the SWGBB processor 210. U.S. application Ser. No. 11/173,252 provides a detailed description of a single weight generator baseband and is hereby incorporated herein by reference in its entirety.

The pre-coding phase and/or amplitude alignment block 201 may comprise suitable circuitry, logic, and/or code and may be adapted to utilize a channel feedback from a single weight generator (SWG) algorithm block, for example. The pre-coding phase and/or amplitude alignment block 201 may receive p-number of signal inputs, $x_{1 \ldots P}$, and may be adapted to utilize a set of weights to convolve with the transmitted signal. The pre-coding phase and amplitude alignment block 201 may be adapted to generate a frequency selective signal by utilizing a 2D filtering process that may comprise, for example, matrix multiplication of the calculated weights and the transmitted data sequences. The channel may then be transformed from a frequency selective channel to a flat fading channel. In this regard, the pre-coding phase and/or amplitude alignment block 201 may be adapted to utilize, for example, an adaptive algorithm to adaptively calculate weights and iteratively search for an optimal weight solution. In accordance with an embodiment of the invention, the pre-coding phase and/or amplitude alignment block 201 may be adapted to utilize, for example, a least mean square (LMS) algorithm for the weight calculation. The LMS algorithm may provide a good compromise between implementation complexity and performance gains. Notwithstanding, the invention is not limited in this regard, and other weight calculation algorithms may be utilized.

A reset signal may be utilized to start the phase rotation start controller 214 during the rotation operation. Estimates from the delay 216 as well as the channel estimate $\hat{h}_1$ of the actual time varying impulse response of the channel for the two receive antennas may be communicated to the channel estimator 218 for processing. When processing is complete, the channel estimator 218 may communicate the matrix $\hat{H}_{2 \times N}$ to the SWG algorithm block 220 and may indicate to the SWG algorithm block 220 that the determination of the appropriate phase and amplitude correction for the portion of the received signal in the second antenna $Rx_2$ 204 may start. The SWG algorithm block 220 may utilize an estimation of the noise power and interference in determining the phase and amplitude values. The SWG algorithm block 220 may provide an indication to the RF phase and amplitude controller 212 which indicates when the weight determination operation ends. The determined phase and amplitude values may then be transferred to the RF phase and amplitude controller 212. The RF phase and amplitude controller 212 may then modify the portion of the received signal in the second antenna $Rx_2$ 204 via the complex multiplier 208.

While the receiver system 200 as shown utilizes two receive antennas, the invention may not be limited in this manner. For example, the SWG channel estimator 218 may be adapted to generate a $\hat{H}_{M \times N}$ matrix, where M represents the number of receive antennas and N represents the number of transmit antennas. In the exemplary representation shown in FIG. 2, the channel estimator 218 may also generate a $\hat{H}_{2 \times 2}$ matrix. Similarly, the SWG algorithm block 220 may be adapted to generate (M-1) pairs of amplitude and phase values for each of the additional receive antennas. In the exemplary representation shown in FIG. 2, the SWG algorithm block 220 may be adapted to generate one set of amplitude and phase values.

Figure 3:
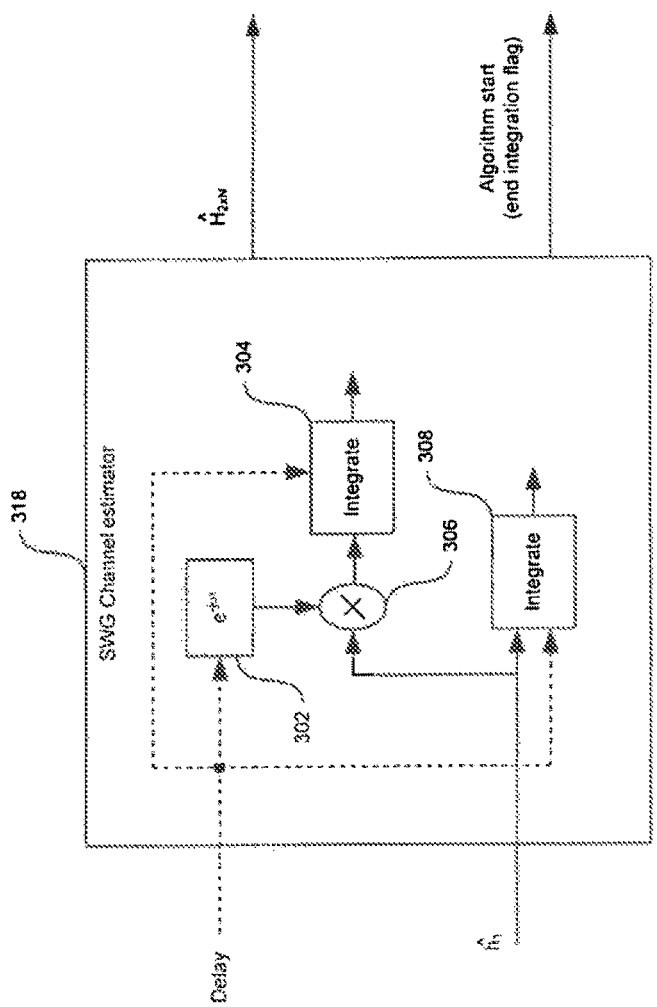
FIG. 3 is a block diagram of an exemplary system for determining channel estimation, in accordance with an embodiment of the invention.

FIG. 3 is a block diagram of an exemplary system for determining channel estimation, in accordance with an embodiment of the invention. Referring to FIG. 3, the channel estimator 318 may comprise a phase rotator 302, a complex combiner 306, a first integrator 304, and a second integrator 308.

In operation, the channel estimator 318 may determine, at the baseband, a combined actual time varying impulse response h of the two receive antennas as $h=h_1+e^{jw_r t}h_2$, where $w_r=2\pi f_r$, $f_r$ is the rotation frequency, and $h_1$ and $h_2$ may represent actual time varying impulse response of the channel from either transmit antenna Tx_1 or transmit antenna Tx_2. Transmitted signals from Tx_1 and Tx_2 may include different common pilot channels, for example, CPICH1 and CPICH2, respectively, so that the channel estimates $\hat{h}_1$ of the actual time varying impulse response of the channel associated with the first antenna ($h_1$) may be determined for both transmit antennas separately. A channel estimate $\hat{h}_1$ of the actual time varying impulse response of the channel for the first receive antenna may be determined by taking the expected valued of h over 0-360 degree rotation periods so that $h_1=E[h_1+e^{jw_r t}h_2]=h_1+E[e^{jw_r t}h_2]$, where $E[e^{jw_r t}h_2]$ over a full rotation is equal to zero.

The above channel estimation technique may be performed for both transmit antennas Tx_1 and Tx_2 using the estimates of the actual time varying impulse response of the channel estimated using CPICH1 and CPICH2, respectively. Consequently, all four transmission channels may be determined from a 2×2 transmission channel matrix H. The actual time varying impulse response for the second receive antenna ($h_2$) may be determined by taking the expected valued of h multiplied by a complex conjugate of the rotation waveform over 0-360 degree rotation periods. In this regard, actual time varying impulse response for the second receive antenna ($h_2$) may be expressed as $h_2=E[e^{-jw_rt}h]=E[e^{-jw_rt}(h_1+e^{jw_rt}h_2)]=E[e^{-jw_rt}h_1+h_2]=E[e^{-jw_rt}h_1]+h_2$, where $E[e^{-jw_rt}h_1]$ over a full rotation is equal to zero. U.S. application Ser. No. 11/173,252 provides a detailed description of a channel estimator and is hereby incorporated herein by reference in its entirety.

Rotation on the second antenna may be done continuously and/or periodically. The reason is that a continuous rotation may be perceived by the modem as a high Doppler, and for some modem implementations this may decrease the modem performance. For example, equalizer tracking may be more difficult to implement. For a receiver employing maximum ratio combining, this effect may be less pronounced. The period between consecutive rotations may depend on the Doppler. In higher Doppler rotation, it may be necessary to track the channel more frequently and in the lower Doppler rotation, tracking may be less frequent. The period may also depend on the desired modem performance and channel estimation accuracy. For example, if the Doppler frequency is 5 Hz, then a period between consecutive rotations of 1/50 Hz, or 10 rotations (channel estimations) per fade, may be selected. The time duration of the rotation itself may be selected based on the channel estimation accuracy and corresponding modem performance. Longer rotation time may result in a better channel estimate because of longer integration.

In one aspect of the invention, the antenna rotation technique may be extended to multiple receive antennas (M). In this regard, (M-1) antenna multiplying waveforms (sequences) may be utilized, which may be orthogonal to each other. For example, Hadamard sequences may be used so that the first antenna sequence is [1 1 1 1], the second antenna sequence is [−1 −1 1 1], the third antenna sequence is [−1 1 −1 1], etc. The invention may not be limited by the number of sequences and other orthogonal sequences and waveforms may also be used.

In the case of multiple transmit antennas (N), each transmit antenna may carry different sequences that may be orthogonal to other transmit antenna sequences. This may be accomplished, for example, by utilizing different common pilot channels (CPICH) or dedicated pilot bit sequences in WCDMA and/or HSDPA. In this case, the same receive antenna channel estimation operation described above may be utilized to estimate all N×M transmit-receive channels. In another aspect of the invention, the SWG channel estimator 318 may process only one channel estimate and/or a plurality of channel estimates. The present invention may not be limited by the number of channel estimates utilized within the SWG channel estimator.

Figure 4:
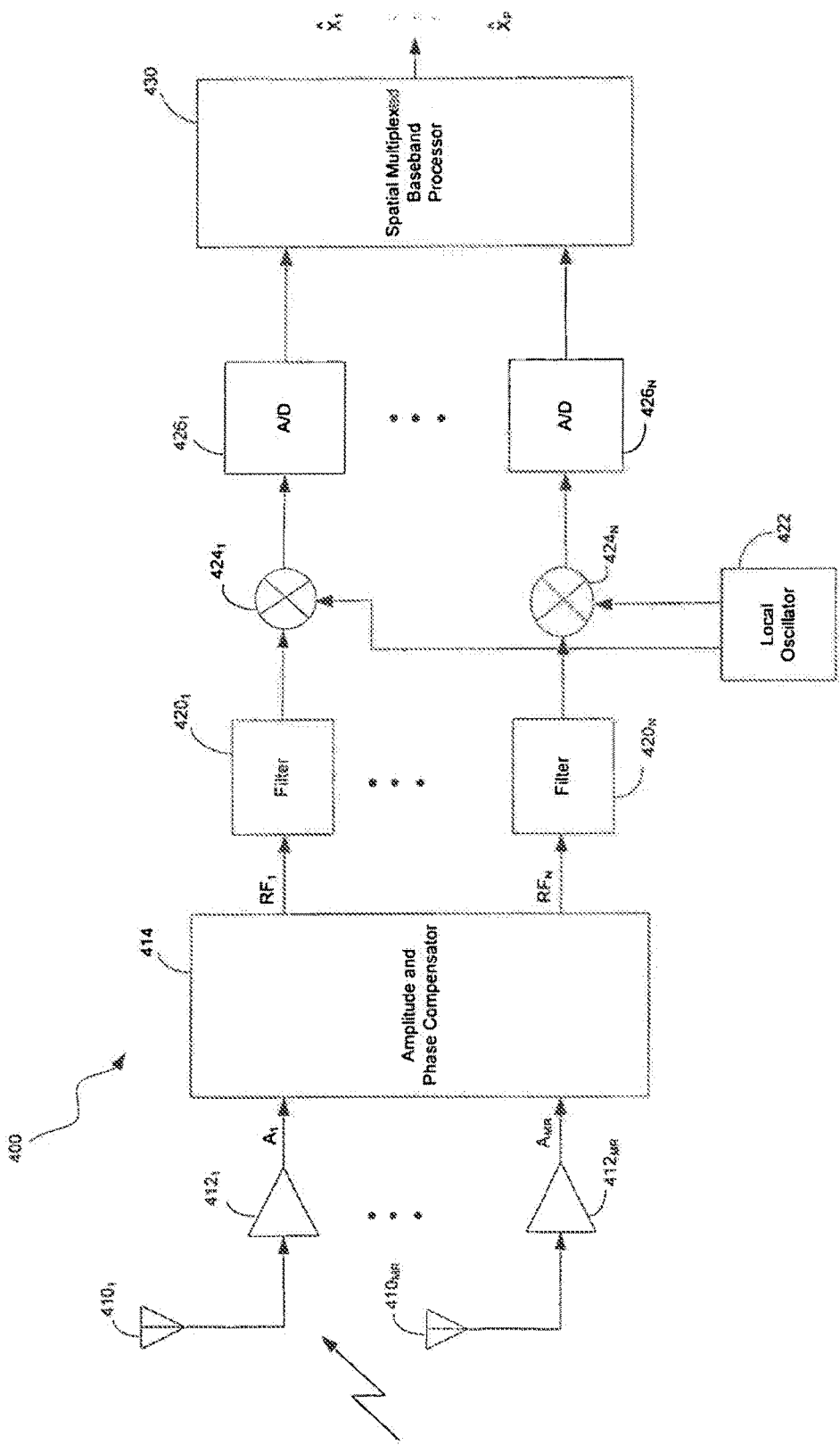
FIG. 4 is a block diagram of an exemplary receiver illustrating spatial multiplexing (SM) in a MIMO communication system that may be utilized in accordance with an embodiment of the invention.

FIG. 4 is a block diagram of an exemplary receiver illustrating spatial multiplexing (SM) in a MIMO communication system that may be utilized in accordance with an embodiment of the invention. Referring to FIG. 4, there is shown a receiver 400 which may comprise a plurality of antennas $410_{1,2,\ldots,MR}$, a plurality of amplifiers $412_{1,2,\ldots,MR}$, a plurality of amplitude and phase compensators 414, a plurality of filters $420_{1,2,\ldots,N}$, a local oscillator 422, a plurality of mixers $424_{1,2,\ldots,N}$, a plurality of analog-to-digital (A/D) converters $426_{1,2,\ldots,N}$, and a spatial multiplexed baseband processor 430.

The antennas $410_{1,2,\ldots,MR}$ may be adapted to receive the transmitted spatially multiplexed signals. The amplifiers $412_{1,2,\ldots,MR}$ may be adapted to amplify the MR received input signals. The amplitude and phase compensator 414 may comprise a plurality of amplitude and phase shifters to compensate for the phase difference between various received input signals. A plurality of weights may be applied to each of the input signals $A_{1\ldots MR}$ to modify the phase and amplitude of a portion of the transmitted signals received by the plurality of receive antennas $412_{1\ldots MR}$ and generate a plurality of output signals $RF_{1\ldots N}$. The plurality of filters $420_{1,2,\ldots,N}$ may be adapted to filter the low frequency components of the RF substreams and the mixers $424_{1,2,\ldots,N}$ may be adapted to downconvert the analog RF substreams to baseband. The local oscillator 422 may be adapted to provide a necessary signal to the mixers $424_{1,2,\ldots,N}$ to downconvert the analog RF substreams to baseband. The analog-to-digital (A/D) converters $426_{1,2,\ldots,N}$ may be adapted to convert the analog baseband substreams into their corresponding digital substreams. The spatial multiplexed baseband processor 430 may be adapted to process the digital baseband substreams and multiplex the plurality of digital signals to generate an output signal, which is an estimate of the original spatially, multiplexed transmitted signal.

In operation, the MT RF spatially multiplexed signals transmitted by a transmitter may be received by a plurality of MR receive antennas $410_{1,2,\ldots,MR}$ deployed at the receiver 400. Each of the MR received signals may be amplified by a respective low noise amplifier $412_{1,2,\ldots,MR}$. A plurality of weights may be applied to each of the input signals $A_{1\ldots MR}$ to modify the phase and/or amplitude of a portion of the transmitted spatially multiplexed signals received by the plurality of receive antennas $412_{1\ldots MR}$ and generate a plurality of output signals $RF_{1\ldots N}$, which may be passed through a plurality of low pass filters $420_{1,2,\ldots,N}$. The resulting N filtered signals may then be downconverted to baseband utilizing a plurality of N mixers $424_{1,2,\ldots,N}$, each of which may be provided with a carrier signal that may be generated by a local oscillator 422. The N baseband signals generated by the mixers $424_{1,2,\ldots,N}$ may then be converted to digital signals by a plurality of analog-to-digital (A/D) converters $426_{1,2,\ldots,N}$. The N digital signals may be further processed by a spatial multiplexed baseband processor 430 to generate estimates of the original spatially multiplexed signal.

Figure 5A:
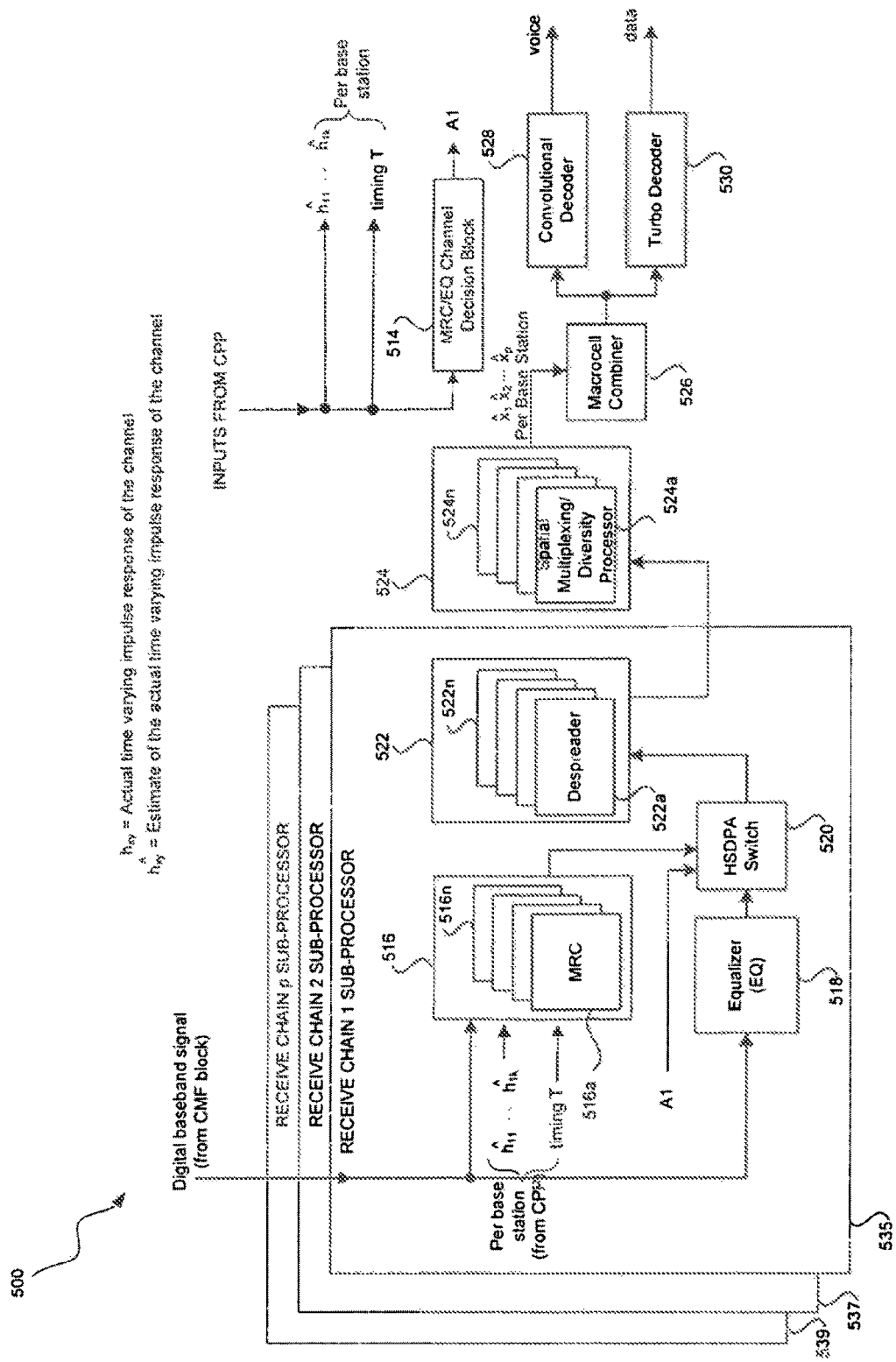
FIG. 5A is a block diagram illustrating a baseband processor utilizing spatial multiplexing and a plurality of receive chain sub-processors, in accordance with an embodiment of the invention.

FIG. 5A is a block diagram illustrating a baseband processor utilizing spatial multiplexing and a plurality of receive chain sub-processors, in accordance with an embodiment of the invention. Referring to FIG. 5A, there is shown a baseband processor block 500 which may comprise a maximum ratio combiner/equalizer (MRC/EQ) channel decision block 514, maximum ratio combiner (MRC) block 516, an equalizer (EQ) block 518, a HSDPA switch 520, a despreader block 522, a spatial multiplexing/diversity processor block 524, a macrocell combiner block 526, a convolutional decoder block 528, and a turbo decoder block 550.

The baseband processor block 500 may be adapted to process varying channel estimates $\hat{h}_{i1\ldots ik}$ of the actual time varying impulse response of the channel for one of a plurality of receive antennas $R_i$ as well as a digital baseband signal, for example from a CMF block, to generate estimates of one or more spatially multiplexed signals. The estimates of the spatially multiplexed signals may be utilized within the baseband processor block 500 to generate a voice signal and a data signal, for example.

The MRC/EQ channel decision block 514 may comprise suitable logic, circuitry, and/or code that may be adapted to generate a signal A1 which may be utilized to select either the output from the MRC block 516 or the EQ block 518. For example, for high Doppler values, where the transmit antenna and/or the receive antennas within a single weight antenna system for spatial multiplexing may be moving at high speeds with respect to each other, the MRC block 516 may yield better performance than the EQ block 518 because of slow EQ convergence time. For high delay spread values, MRC block 516 may be selected. For high Doppler values, high pilot filter bandwidth values may be selected. The pilot filter bandwidth may influence channel estimation accuracy and may be set to more averaging (filtering) when Doppler values may be low. Also, MRC block 516 and EQ block 518 pilot filter bandwidth values may be different for the same value of Doppler. For a system that may use multiple antenna channel estimation using phase rotation, MRC block 516 may yield better modem performance. Based on a received signal tuple (xEQ, nEQ), the maximum ratio combining and equalization channel decision control block 514 may generate an equalizer control signal that may be utilized to control the operation of the equalizer 518

The despreader for common and dedicated pilot signals block 513 may comprise suitable circuitry, logic, and/or code that may be adapted to utilize received signals from the maximum ratio combiner 516, and to compute estimates for at least a portion of transmitter input signals x1, x2, ..., xn. In addition, the despreader for common and dedicated pilot signals block 513 may compute estimates for noise, 513a and 513b, contained in the received signal from the maximum ratio combiner 516. Noise components 513a and 513b may have been introduced while the received signal from a transmitter was propagated through the transmission medium between the transmitter and the receiver.

The maximum-ratio combining (MRC) block 516 may comprise a plurality of MRC blocks, namely 516a, ..., 516n. Timing and channel estimates of the time varying impulse response of the channel may be provided to the MRC block 516 on a per base station basis. In accordance with an embodiment of the invention, the maximum-ratio combining block 516 may comprise suitable logic, circuitry, and/or code that may be adapted to add individual distinct path signals, received from the assigned RF channel, together in such a manner to achieve the highest attainable signal to noise ratio (SNR). The highest attainable SNR may be based upon maximum ratio combining, optimal combining and/or other rule, and may also be related to the RMS noise level that may be introduced to each received individual distinct path signal within a received signal duster. The maximum-ratio combining block 516 may be also adapted to utilize the same proportionality constant for the individual distinct path signals, in which case the rake receiver may be known as an "equal gain combiner".

In one embodiment of the invention, the assignment of fingers in the maximum-ratio combining block 516 may be based on channel estimates h1 and h2 from the cluster path processor block 210. The proportionality constants utilized in the maximum-ratio combining block 216 may be based on the valid channel estimates, ĥ1 and ĥ2, from the cluster path processor block 210.

The HSDPA switch 520 may comprise suitable logic, circuitry, and/or code that may be adapted to switch input data from the MRC block 516 or from the EQ block 518 to transfer its output. The despreader block 522 may comprise a plurality of despreader blocks 522a, ..., 522n. Each of the despreader (DS) blocks 522a, ..., 522n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The DS block 522 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

The spatial multiplexing/diversity processor block 524 may comprise a plurality of spatial multiplexing/diversity processor blocks 524a, ..., 524n, each of which may comprise suitable logic, circuitry, and/or code that may be adapted to combine signals transmitted from multiple antennas in diversity modes. The diversity modes may comprise open loop (OL), closed loop 1 (CL1) and closed loop 2 (CL2). In accordance with an embodiment of the invention, the diversity mode signals may be processed in a single hardware block requiring the same received signal inputs from MRC block 516.

The macrocell combiner block 526 may comprise suitable logic, circuitry, and/or code that may combine signals from adjacent base stations. The macroscopic diversity scheme may be utilized for combining two or more long-term lognormal signals, which may be obtained via independently fading paths received from two or more different antennas at different base-station sites. The microscopic diversity schemes may be utilized for combining two or more short-term Rayleigh signals, which are obtained via independently fading paths received from two or more different antennas but only one receiving co-site.

The convolutional decoder block 528 may comprise suitable logic, circuitry, and/or code that may be utilized to handle decoding of convolutional codes as indicated in the 3GPP specification. The output of the convolutional decoder may be a digital signal, which comprises voice information, suitable for processing by a voice processing unit. The turbo decoder block 530 may comprise suitable logic, circuitry and/or code that may be utilized to handle decoding of turbo codes as indicated in the 3GPP specification. The output of the turbo decoder block 530 may be a digital signal comprising data information, which may be suitable for use by, for example, a video display processor.

In operation, the baseband processor block 500 may be adapted to receive the baseband signal from a CME block, for example. In addition, channel estimates $\hat{h}_{i1 \ldots ik}$ of the actual time varying impulse response of the channel for each receive antenna $R_i$ within a spatial multiplexing MIMO system, along, with timing information T, may be communicated from one or more CPP blocks, for example. The channel estimates $\hat{h}_{i1 \ldots ik}$ of the actual time varying impulse response of the channel for each receive antenna $R_i$ along with the timing information T may be communicated to the MRC/EQ channel block 514 and the MRC block for further processing. The MRC/EQ channel block 514 may process received inputs and generate a corresponding output signal A1, which may be communicated to the HSDPA switch 520. The HSDPA switch 520 may be configured to select either the output of the MRC block 516 or the output of the EQ block 518 for further processing.

The MRC block 516 may utilize the estimates $\hat{h}_{i1 \ldots ik}$ of the actual time varying impulse response of the channel and timing information T. The MRC block 516 may then combine the multipath signals present in the digital baseband signal and communicate an output signal to the HSDPA switch 520. The EQ block 518 may transform a channel from a frequency selective channel to a flat fading channel and the output of the EQ block 518 may be communicated to the HSDPA switch 520. The output of the HSDPA switch 520 may be communicated to the input of the despreader block 522, which may remove orthogonal channelization codes induced at the transmitter to despread the estimated signal from the MRC block 516 so as to generate the original spatially multiplexed data $x_1, x_2, \ldots, x_n$, which was transmitted. The output of the despreader block 522 may be communicated to the input of the spatial multiplexing/diversity processor block 524.

The spatial multiplexing/diversity processor block 524 may be adapted to combine signals transmitted from multiple antennas in diversity modes—Open Loop, Closed Loop 1 (CL1) and Closed Loop 2 (CL2)—on a per base station basis. The diversity mode signals may be processed utilizing, for example, the same received signal inputs from MRC block 516, and may communicate the output of the spatial multiplexing/diversity processor block 524 to the macrocell combiner block 526. The macrocell combiner block 526 may configured to as to achieve macroscopic diversity. The output signals generated by the macrocell combiner block 526 may be communicated to the convolutional decoder block 528 and the turbo decoder block 530, where processing may generate output voice signals and output data signals, respectively. The output voice signals may be communicated to a voice processing device, which may convert the digital data to an analog signal, and the data signal may be communicated to a processor, such as a digital display processor, which may communicate the information to video display such as an LCD display, for example.

In an exemplary embodiment of the invention, the baseband processor block 500 may comprise a plurality of receive chain sub-processors 535 through 539, corresponding to a p-number of receive chains. Each of the receive chain sub-processors 535 through 539 may implement an MRC block, such as MRC block 516, a despreader block, such as despreader block 522, an equalizer block, such as the equalizer block 518, and an HSDPA switch, such as the HSDPA switch 520.

Figure 5B:
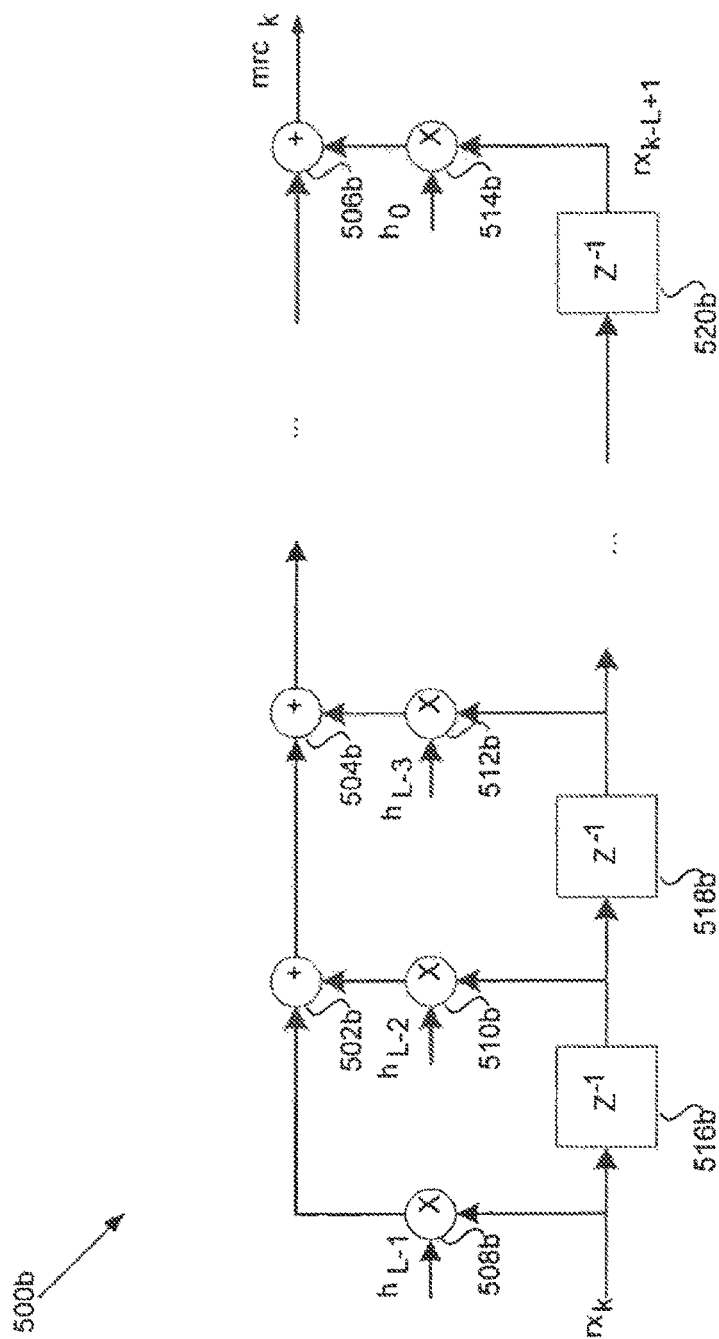
FIG. 5B illustrates an exemplary maximum-ratio combining (MRC) block, in accordance with an embodiment of the invention.

FIG. 5B illustrates an exemplary maximum-ratio combining (MRC) block, in accordance with an embodiment of the invention. Referring to FIG. 5B, the maximum-ratio combining (MRC) block 500b may comprise a plurality of adders 502b, ..., 506b, a plurality of multipliers 508b, ..., 514b, and a plurality of delay blocks 516b, ..., 520b. In one embodiment of the invention, the MRC block 500b may receive a plurality of channel estimates $h_{ik}$ (i=0,1, ..., L−1) from a corresponding cluster path processor block. For example, the MRC block 500b may receive estimate vectors $\hat{h}_1$ and $\hat{h}_2$ of the actual time varying impulse response of a channel, from a cluster path processor. Each of the estimate vectors $\hat{h}_1$ and $\hat{h}_2$, may comprise a cluster grid of channel estimates $h_{ik}$ (i=0, 1,...,L−1), where L may indicate the width of the cluster grid of estimates and may be related to the delay spread of the channel.

In operation, the MRC block 500b may be adapted to implement the following equation:

$$mrc_k = \sum_{i=0}^{L-1} h_{L-1-i} \cdot rx_{k-i}$$

where mrck is the output of the MRC block 500b, hL−1−I is the plurality of channel estimates corresponding to a channel estimate vector, such as $\hat{h}_1$ and $\hat{h}_2$ and rxk is a filtered complex input signal. The MRC block 500b may be adapted to add individual distinct path signals together in such a manner to achieve a high signal to noise ratio (SNR) in an output signal mrck.

The MRC block 500b may receive a filtered complex signal rxk from a chip matched filter (CMF), for example. The filtered complex signal rxk may comprise in-phase (I) and quadrature (Q) components of a received signal. Furthermore, the filtered complex signal rxk may be gated by cluster path processor (CPP) output strobes derived from a CPP timing reference, for example. Channel estimates hik (i=0, 1,...L−1) may be applied to the CMF output rxk beginning with the last in time, hL−1, and proceeding with channel estimates hL−2, ..., h0, utilizing multiplier blocks 508b, ..., 514h, respectively. The filtered complex input signal rxk may be continuously delayed by delay blocks 516b, ..., 520b. Each delayed output of the delay blocks 516b, ..., 520b may be multiplied by the multiplier blocks 510b,..., 514b, respectively, utilizing corresponding channel estimates hik. The outputs of the multipliers 502b, ..., 506h may be added to generate the output signal mrck, thereby implementing the above-referenced MRC equation.

Figure 6:
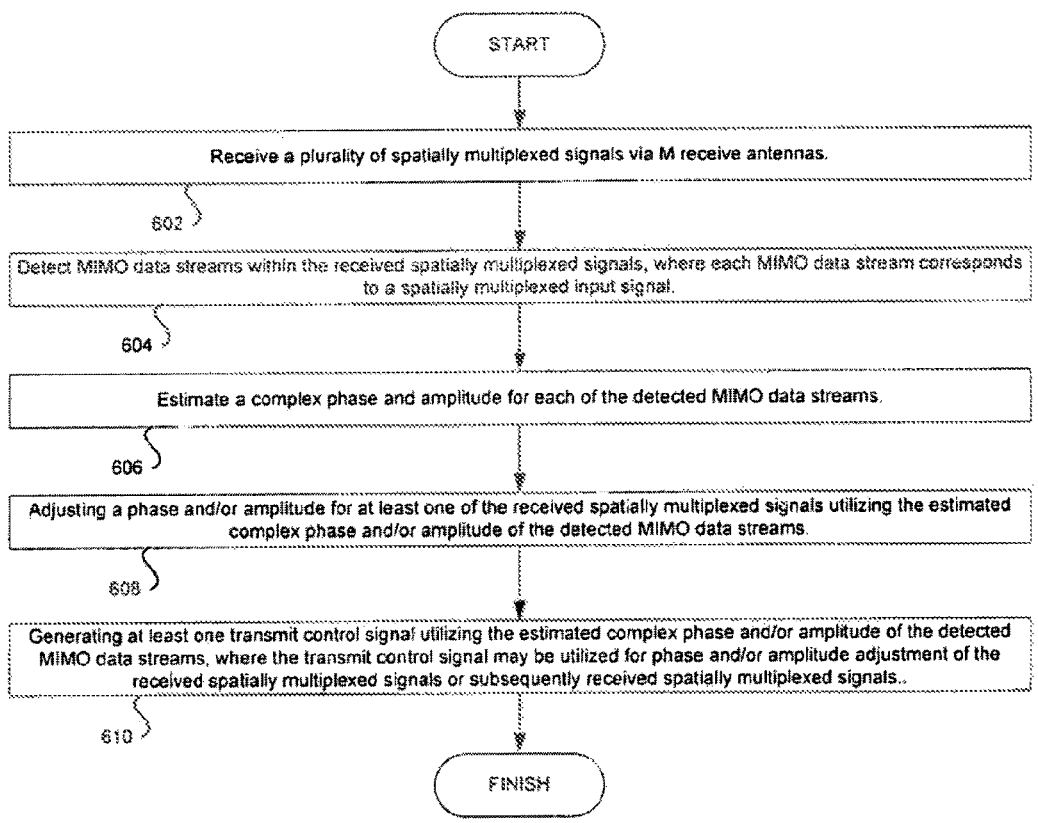
FIG. 6 is a flow diagram illustrating exemplary steps for signal equalization, in accordance with an embodiment of the invention.

FIG. 6 is a flow diagram illustrating exemplary steps for signal equalization, in accordance with an embodiment of the invention. Referring to FIG. 6, at 602, a plurality of spatially multiplexed signals may be received via M receive antennas. At 604, MIMO data streams may be detected within the received spatially multiplexed signals, where each MIMO data stream may correspond to a spatially multiplexed input signal. At 606, a complex phase and/or amplitude may be estimated for each of the detected MIMO data streams utilizing (M-1) phase shifters, for example. At 608, a phase and/or amplitude for at least one of the received spatially multiplexed signals may be adjusted utilizing the estimated complex phase and/or amplitude of the detected MIMO data streams. At 610, one or more transmit control signals may be generated utilizing the estimated complex phase and/or amplitude of the detected MIMO data streams. Each transmit control signal may be utilized for phase and/or amplitude adjustment of the received spatially multiplexed signals or subsequently received spatially multiplexed signals.

Certain embodiments of the invention may be found in a method and system for processing signals in a receiver. Aspects of the method may comprise receiving spatially multiplexed signals via M receive antennas $128_1$ to $128_M$, for example. A plurality of multiple data streams may be separated in the received spatially multiplexed signals to detect MIMO data streams. Each of the MIMO data streams may correspond to a spatially multiplexed input signal. A complex phase and/or amplitude may be estimated for each of the detected MIMO data streams utilizing (M-1) phase shifters. Complex waveforms, comprising in-phase (I) and quadrature (Q) components for the MIMO data streams within the received spatially multiplexed signals may be processed and resulting processed complex waveforms may be filtered to generate signals that are bandwidth limited to baseband bandwidth. A phase and/or amplitude for one or more of the received spatially multiplexed signals may be adjusted utilizing the estimated complex phase and amplitude.

The phase and/or amplitude may be adjusted continuously and/or at discrete intervals. The multiple data streams within the received spatially multiplexed signals may be transmitted via at least one antenna $126_{11}$ to $126_{N1}$ or $124_{1k}$ o $124_{Nk}$, for example, from at least one transmit base station. A channel estimate of a time varying impulse response for at least one of the multiple data streams within the received spatially multiplexed signals may be generated. A transmit control signal may be generated utilizing the channel estimate of the time varying impulse response. The generated transmit control signal may be utilized for phase and/or amplitude adjustment of the received spatially multiplexed signals or subsequently received spatially multiplexed signals. The transmit control signal may be generated via a single weight generator.

Another embodiment of the invention may provide a machine-readable storage, having stored thereon, a computer program having at least one code section executable by a machine, thereby causing the machine to perform the steps as described above for processing signals in a receiver.

Aspects of the system may comprise a plurality of M receive antennas $128_1$ to $128_M$, for example, that receive spatially multiplexed signals. A plurality of multiple data streams in the received spatially multiplexed signals may be separated by a first processor to detect one or more MIMO data streams. Each the MIMO data streams may correspond to a spatially multiplexed input signal. A complex phase and/or amplitude of each of the detected MIMO data streams may be estimated by a channel estimator 141 utilizing (M-1) phase shifters. Complex waveforms comprising in-phase (I) and quadrature (Q) components for the plurality of MIMO data streams within the received spatially multiplexed signals may be processed by a filter. The filter may be adapted to filter the processed complex waveforms to generate baseband bandwidth limited signals. A phase and/or amplitude for one or more of the received spatially multiplexed signals may be adjusted by a second processor utilizing the estimated complex phase and amplitude.

The phase and/or amplitude may be adjusted continuously and/or at discrete intervals. The multiple data streams within the received spatially multiplexed signals may be transmitted via at least one antenna $126_{11}$ to $126_{N1}$ or $124_{1k}$ o $124_{Nk}$, for example, from at least one transmit base station. One or more channel estimates of a time varying impulse response for the multiple data streams within the received spatially multiplexed signals may be generated by a channel estimator. A transmit control may be generated by a control signal generator utilizing the channel estimates of the time varying impulse response. The generated transmit control signal may be utilized for a phase and/or amplitude adjustment of the received spatially multiplexed signals or subsequently received spatially multiplexed signals. The transmit control signal may be generated via a single weight generator 210.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments ailing within the scope of the appended claims.

What is claimed is:

1. A wireless transceiver device in a MIMO system, the wireless transceiver device comprising:
    a first port configured to receive spatially multiplexed signals from a plurality of transmitting devices;
    a second port configured to receive the spatially multiplexed signals from the plurality of transmitting devices; and
    a single weight generator configured to generate a feedback signal based on a channel estimation matrix representative of channel responses of channels between each of the plurality of transmitting devices and each of the first port and second port, the single weight generator further configured to transmit the feedback signal to the plurality of transmitting devices,
    wherein the feedback signal includes information with which the plurality of transmitting devices modify signals to be transmitted, and
    wherein the plurality of transmitting devices are physically independent from each other.

2. The wireless transceiver device of claim 1, further comprising:
    a first cluster path processor configured to receive the spatially multiplexed signals received by the first port, and to estimate first channel responses of channels between each of the plurality of transmitting devices and the first port; and
    a second cluster path processor configured to receive the spatially multiplexed signals received by the second port, and to estimate second channel responses of channels between each of the plurality of transmitting devices and the second port.

3. The wireless transceiver device of claim 2, further comprising a single weight generator channel estimator configured to receive the first channel responses and the second channel responses, and to generate the channel response matrix.

4. The wireless transceiver device of claim 1, further comprising a pre-equalization circuit configured to generate first output signals based on the spatially multiplexed signals received by the first port, and to generate second output signals based on the spatially multiplexed signals received by the second port, based on a pre-equalization modification signal received from the single weight generator,
    wherein the single weight generator is further configured to generate the pre-equalization modification signal based on the channel estimation matrix.

5. The wireless transceiver device of claim 4, wherein the pre-equalization modification signal includes a plurality of amplitude values and a plurality of phase values.

6. The wireless transceiver device of claim 5, wherein the pre-equalization circuit is configured to modify at least one of an amplitude and a phase of at least a portion of the spatially multiplexed signals received by the first port and at least a portion of the spatially multiplexed signals received by the second port.

7. The wireless transceiver device of claim 4, wherein the feedback signal includes a plurality of weighting values.

8. The wireless transceiver device of claim 7, wherein the plurality of weighting values are calculated based on a cost function or a second order statistical technique based on a pre-equalization method used by the pre-equalization circuit.

9. The wireless transceiver device of claim 1, wherein the plurality of transmitting devices are base stations.

10. A method, comprising:
  receiving spatially multiplexed signals from a plurality of transmitting devices at a first port;
  receiving the spatially multiplexed signals from the plurality of transmitting devices at a second port;
  generating a feedback signal based on a channel estimation matrix representative of channel responses of channels between each of the plurality of transmitting devices and each of the first port and second port; and
  transmitting the feedback signal to the plurality of transmitting devices,
  wherein the feedback signal includes information with which the plurality of transmitting devices modify signals to be transmitted, and
  wherein the plurality of transmitting devices are physically independent from each other.

11. The method of claim 10, further comprising:
  estimating first channel responses of channels between each of the plurality of transmitting devices and the first port based on the spatially multiplexed signals received by the first port; and
  estimating second channel responses of channels between each of the plurality of transmitting devices and the second port based on the spatially multiplexed signals received by the second port.

12. The method of claim 11, wherein the channel response matrix is generated based on the first channel responses and the second channel responses.

13. The method of claim 10, further comprising:
  calculating a pre-equalization modification signal based on the channel estimation matrix;
  generating first output signals based on the spatially multiplexed signals received by the first port based on the pre-equalization modification signal; and
  generating second output signals based on the spatially multiplexed signals received by the second port, based on the pre-equalization modification signal.

14. The method of claim 13, wherein the pre-equalization modification signal includes a plurality of amplitude values and a plurality of phase values.

15. The method of claim 14, further comprising:
  modifying at least one of an amplitude and a phase of at least a portion of the spatially multiplexed signals received by the first port; and
  modifying at least one of an amplitude and a phase of at least a portion of the spatially multiplexed signals received by the second port.

16. The method of claim 13, wherein the feedback signal includes a plurality of weighting values.

17. The method of claim 16, wherein the plurality of weighting values are calculated based on a cost function or a second order statistical technique based on a pre-equalization method used by a pre-equalization circuit.

18. A wireless transceiver device in a MIMO system, the wireless transceiver device comprising:
  a first port configured to receive spatially multiplexed signals from a plurality of transmitting devices;
  a second port configured to receive the spatially multiplexed signals from the plurality of transmitting devices;
  a first cluster path processor configured to receive the spatially multiplexed signals received by the first port, and to estimate first channel responses of channels between each of the plurality of transmitting devices and the first port;
  a second cluster path processor configured to receive the spatially multiplexed signals received by the second port, and to estimate second channel responses of channels between each of the plurality of transmitting devices and the second port; and
  a single weight generator configured to generate a feedback signal based on a channel estimation matrix representative of the first channel responses and the second channel responses, the single weight generator further configured to transmit the feedback signal to the plurality of transmitting devices;
  wherein the feedback signal includes information with which the plurality of transmitting devices modify signals to be transmitted.

19. The wireless transceiver device of claim 18, further comprising: a pre-equalization circuit configured to adjust at least one of a phase and an amplitude of the spatially multiplexed signals received by the first port and the second port based on a plurality of channel weights.

20. The wireless transceiver device of claim 19, wherein the plurality of channel weights are generated based on interference propagation estimates.

* * * * *

UNITED STATES PATENT AND TRADEMARK OFFICE
CERTIFICATE OF CORRECTION

| | | |
|---|---|---|
| PATENT NO. | : 8,817,825 B2 | Page 1 of 1 |
| APPLICATION NO. | : 13/784340 | |
| DATED | : August 26, 2014 | |
| INVENTOR(S) | : Kent et al. | |

It is certified that error appears in the above-identified patent and that said Letters Patent is hereby corrected as shown below:

Title page, item (63), please replace "application No. 11/174,067, filed on Jun. 30, 2008" with --application No. 11/174,067, filed on Jun. 30, 2005--.

Signed and Sealed this
Twenty-third Day of December, 2014

Michelle K. Lee
*Deputy Director of the United States Patent and Trademark Office*